United States Patent [19]

Ogawa

[11] 3,841,753
[45] Oct. 15, 1974

[54] SCANNING SYSTEM
[75] Inventor: Masaya Ogawa, Toyokawa City, Japan
[73] Assignee: Minolta Camera Kabushiki Kaisha, Osaka, Japan
[22] Filed: July 13, 1972
[21] Appl. No.: 271,308

[30] Foreign Application Priority Data
Aug. 2, 1971  Japan............................... 46-58083
Aug. 2, 1971  Japan............................... 46-58084

[52] U.S. Cl..................................... 355/8, 355/66
[51] Int. Cl............................................. G03g 15/04
[58] Field of Search.............. 355/8, 64, 65, 66, 51, 355/60, 11, 49, 57

[56] References Cited
UNITED STATES PATENTS
2,725,800  12/1955  Dewhurst.......................... 355/66 X
3,330,181  7/1967   Jakobson.......................... 355/66 X
3,431,053  3/1969   Wick et al. ...................... 355/66
3,451,752  6/1969   Frank................................ 355/66 X
3,606,535  9/1971   Koizumi............................. 355/66
3,609,024  9/1971   Suzuki............................ 355/66 X
3,720,466  3/1973   Koizumi............................. 355/8

Primary Examiner—Samuel S. Matthews
Assistant Examiner—Kenneth C. Hutchison
Attorney, Agent, or Firm—Wolder & Gross

[57] ABSTRACT

A scanning type exposure device in an electrostatic copier comprises an optical system movable between and parallel to the transversely spaced parallel original and photosensitive sheet member and includes a stationary objective mirror-lens or lens and a first reflector system movable to scan the original and expose successive sections thereof to the objective and a second reflector system for scanning the photosensitive sheet to project images of successive sections of the original thereon. The scanning reflector systems move in synchronization and the elements thereof move to maintain a constant optical path length between the original and the photosensitive sheet respectively and the objective.

11 Claims, 8 Drawing Figures

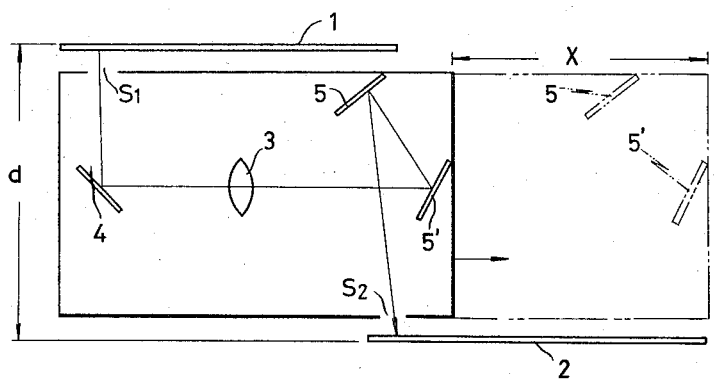
FIG. 1
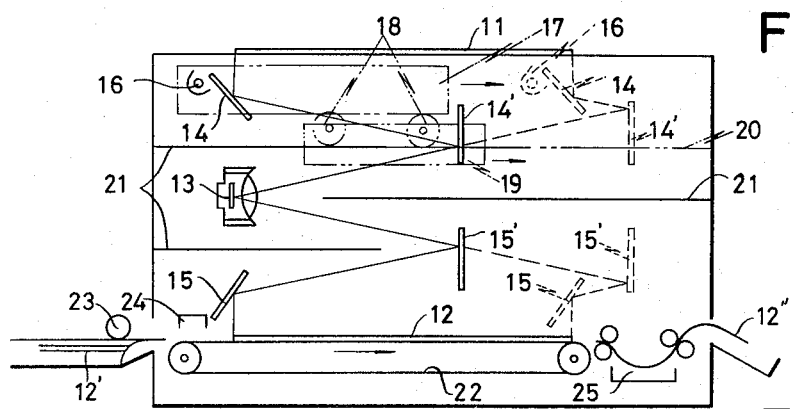
FIG. 3
FIG. 2
FIG. 4
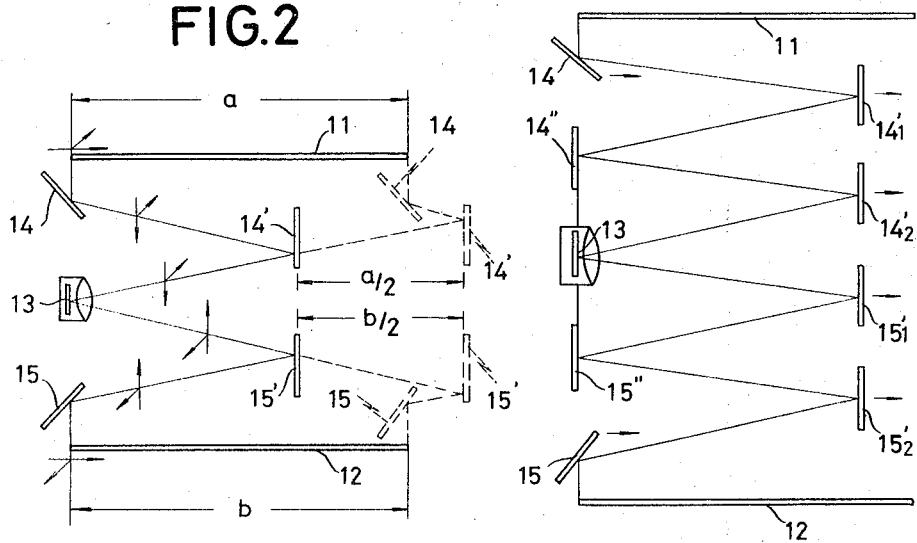

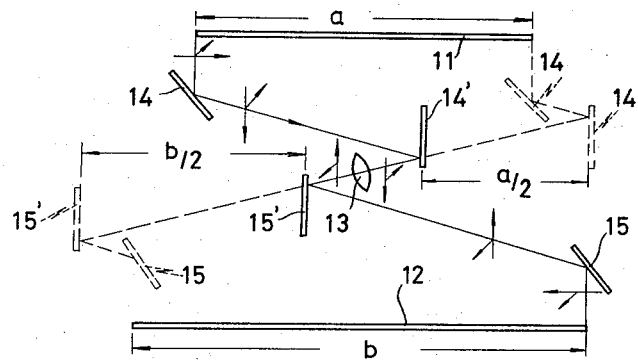
FIG. 5
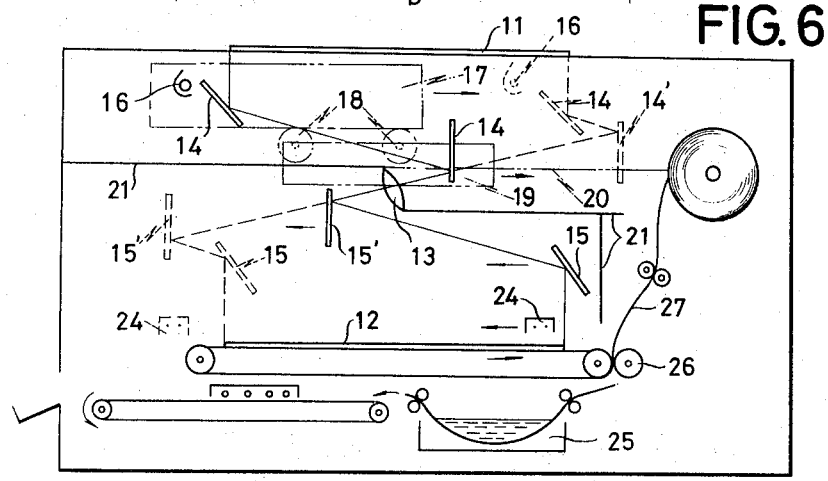
FIG. 6
FIG. 7
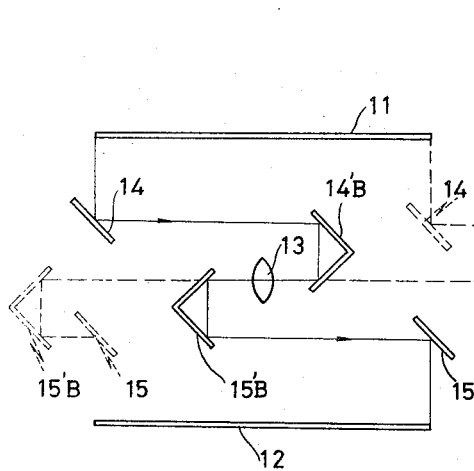
FIG. 8
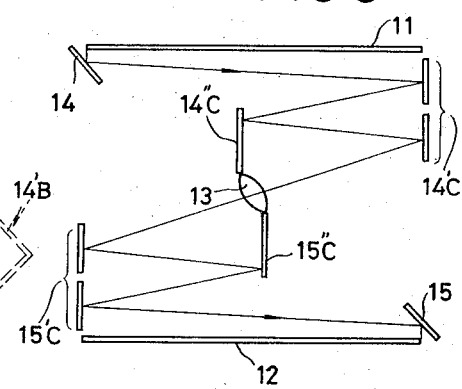

SCANNING SYSTEM

The present invention relates to a projector copier in which the original and the photosensitive member are stationary, and more particularly to a projector of the optical scanning type.

As well known to persons skilled in the art, there are two types of projection methods utilized in copying devices, one of which is a full frame projection method. The device for carrying out this method is constructionally simple, but disadvantageous in that the dimensions of the device are necessarily large, and requires the use of a relatively expensive wide angle lens system to accomplish the correct projection of the original image evenly at every corner, and is further disadvantageous in that a nonuniform concentration density occurs on the copy due to insufficient light volume at the edges. On the contrary the device for practicing the other method, namely the so-called scanning projection, can be made compact because of a smaller distance between the original plane and the plane on which the image is projected and consequently the photosensitive sheet member is laid, since the projection is made consecutively section by section of the original. It is preferable further since a conventional and relatively low cost lens system can be used to obtain fairly homogeneous exposure over the total area for the reason mentioned above. The scanning projection method is, thus, preferable in general to the full frame projection method.

It is, thus, a principal object of the present invention to improve the copier employing the scanning projection method by avoiding and overcoming the defects referred to above but possessing the advantages of the conventional device.

Namely it is possible according to the invention to provide a far more compact copier projector device employing the scanning projection method and permitting the selection of a desired magnification.

The prior art and preferred embodiments of the invention shall be explained in more detail and definitiveness in reference to the accompanying drawings, in which FIG. 1 is a diagram showing the principle of the scanning projection method or the fundamental arrangement of the optical system relative to the original and the photosensitive paper in the conventional device for carrying out said method, FIG. 2 is a similar view of the improved principle of arrangement according to the invention, FIG. 3 is a schematic view in side elevation illustrating a device employing the principle illustrated in FIG. 2 used in an electronic copier, FIG. 4 is a diagram showing a modification of the principle shown in FIG. 2, FIG. 5 is a diagram showing a variation of the principle or arrangement illustrated in FIG. 2, FIG. 6 is a schematic view illustrating a device employing the principle of FIG. 5 used in an electronic copier, FIG. 7 is a diagram showing a modification of the principle in FIG. 5, and FIG. 8 is a similar view showing another modification.

In FIG. 1, an original 1 and a photosensitive paper 2 are arranged with the former above the latter respectively in horizontal relation and in parallel relation with each other but relatively displaced according to the conventional arrangement of the optical system for practicing the scanning method. Between the original 1 and the photosensitive paper 2, there is provided an optical system comprising a plurality of elements which are relatively and fixedly positioned to one another but adapted to be moved as a whole in a direction as illustrated by an arrow in FIG. 1. The optical system included in a light shielded casing comprises a lens 3, a mirror 4 for receiving light, which is reflected from the original 1 illuminated by a light source, not shown, through a transversely long slit $S_1$ formed in said casing and for directing light to said lens for focussing, and mirrors 5, 5' for receiving light from the lens 3 to reflect it through a transversely long slit $S_2$ formed also in the casing onto the photosensitive paper 2 placed horizontally at the bottom of the device casing.

When the optical system consisting of the elements 3, 4, 5, 5' as a whole occupies the position represented by the solid lines in FIG. 1 or the leftmost position therein, the leftmost transversely long section of the image on the original 1 is projected on to the photosensitive paper 2 at the frontmost side in view of the direction of the optical system movement or the leftmost side in FIG. 1. The movement of the optical system in the right direction of the drawing for the scanning will, as readily appreciated, proceed with the consecutive projection of the original image, and when the system reaches the position represented by the phantom lines, whereby only the mirrors 5 and 5' are shown but the lens 3 and the mirror 4 are omitted for the sake of clarification, the necessary projection has been completed.

It will be appreciated from the above that the distance $d$ between the planes of the original 1 and the photosensitive paper 2 is small, but the distance represented by $x$ over which the optical system must be moved as a whole for the scanning is necessary according to the conventional method. If it is possible to eliminate the space defined by said distance $x$, the device would be made far more compact, which is achieved by the present invention. It will be appreciated also that the projection magnification must be always of 1 : 1 relation according to the conventional arrangement.

In FIG. 2, showing an example of the principle of the invention, the original and the photosensitive paper are represented respectively by 11 and 12 which are arranged horizontally and face to face or oppositely as in the conventional method or device, but in alignment. The optical system according to this embodiment comprises a mirror-lens 13 that is, an optical member in which the incident object light rays are reflected to form an image, and mirrors 14, 14', 15, 15' which are so arranged that first the mirror 14 and then the mirror 14' receives light reflected from the original 11 at the leftmost transversely long section through the slit, not shown, to direct it to the mirror-lens 13 which condenses and reflects the incident light to the mirror 15' and then to the mirror 15 which projects the corresponding transversely long section of the image onto the photosensitive member 12 at the leftmost end thereof. Different from the usual device, the mirror-lens 13 is fixedly positioned relative to the device casing inclusive of the original 11 and the photosensitive member 12, and not only are the mirrors 14, 14', 15, 15' movable in relation to said fixedly positioned mirror-lens 13 but also the relative positions between them are varied. In order to attain the necessary scanning, the mirror 14 arranged on the impinging or upstream or object side relative to the mirror-lens 13 naturally must be moved from the leftmost position as illustrated by the solid lines in said FIG. 2 to the rightmost position, in phantom lines, over the effective length of the original 11, which is represented by a, and the mirror 15 on the exiting or downstream or image side is moved similarly from the leftmost solid line position to the rightmost phantom line position over the effective length of the photosensitive paper 12 are represented by b. In order to carry out the effective projection of the rightmost portion of the image on the original 11 onto the rightmost portion of the photosensitive paper when the mirrors 14 and 15 have been moved to occupy the positions in the phantom lines, the second mirror 14' on the impinging side and the second mirror 15' on the exiting side are moved also in the same direction but not as much as the mirrors 14 and 15. Supposing that the movement length is a for the mirror 14 and b for the mirror 15 as referred to above, such extent is to be a/2 for the mirror 14' and b/2 for the mirror 15' that is, the rate of movement of mirrors 14' and 15' is one-half those of mirrors 14 and 15. In order to keep the optical conditions or effects constant during the movement of the mirrors 14 and 15 from the initial position in the solid lines to the complete position in the phantom lines, the second mirror 14' is moved in such a way that the total length of the light passage from the original 11 through the mirrors 14, 14' to the mirror-lens 13 remains constant and is not at all varied from the beginning to the end, and this is similarly applicable to the optical elements 15, 15' on the exiting side. This movement may be achieved by using a cable-pulley mechanism or the like, which shall be similarly applied to the exiting side mirrors 15 and 15'. When the optical elements are so arranged that the length a equals to the length b, then the magnification is to be of 1 : 1. So far as the optical distance on the impinging side from the original 11 to the mirror-lens 13 as well as that on the exiting side from the mirror-lens 13 to the sensitive paper 12 are respectively kept always constant, the scanning projection can be carried out at a desired magnification of b/a.

Now changes of the up-down or top-bottom and left-right relations of the image, which changes might be caused by the light passing through the lens and reflecting on the mirror, will be traced from the original 11 to the photosensitive paper 12 in the arrangement of FIG. 2. The relations are shown in the drawing by small arrows. It will be appreciated that the up-down relation of the image for instance on the original 11 is represented by the left-right direction arrow in FIG. 2 wherein said original 11 laid horizontally is shown in the side elevation. The left-right relation of the image is represented as a matter of convenience by the oblique arrows. The oblique arrows directed upward show the direction of left to right of the image, and the oblique arrows directed down show the inverted left-right direction. In tracing changes of these small arrows, it is noted that the image finally obtained on the photosensitive paper 12 coincides with the original image 11 in the left-right relation. Thus the device of this arrangement is suitable for the copier in which the original is to be directly projected on the photosensitive paper.

FIG. 3 shows the electrophotographic copier and projector device for carrying out the principle of FIG. 2, in which the original, the photosensitive paper, the first and second mirrors on both the impinging and exiting sides, and the mirror-lens are similarly represented and arranged. Adjacent to the mirror 14, there is provided a light source 16 for directionally illuminating a portion of the image on the original 11 so that the reflected light can be received by the mirror 14 to direct it to the second or intermediate mirror 14'. The mirror 14 and the light source 16 are mounted together on a frame 17 which is movable toward the right direction as shown by the arrow and is supported by a plurality of rollers 18 which rotate over the guide means 20 placed parallel to the image side of the original for the scanning over the effective length of the original 11. The intermediate mirror 14' is mounted to the second frame 19, and this frame includes said rollers 18 for rotation and is arranged to be movable with said rollers for one-half movement toward the same direction synchronously with said first frame. In addition to this, the mirrors 15, 15' of the exiting side are similarly mounted to the respective frames which are arranged to move in the speed ratio of 1:½ not shown in the figure. There is not shown how or by what means said frames 17 and 19 are moved, but it is not necessary to explain in more detail, since it is very easy for those skilled in the art to provide a mechanism for moving the frame 17 and consequently the light source 16 and the mirror 14 at a constant and predetermined speed over the distance corresponding to the effective length of the original from the initial solid line position to the phantom line position (similar for the frame of the mirror 15 corresponding to the frame 17 and also for the frame of the mirror 15' corresponding to the frame 19), and concurrently moving the frame 19 and consequently the mirror 14' similarly but over the distance of half of the above, and since the present invention does not lie in such mechanism itself. It is necessary to provide partition walls 21 for light shielding in the device casing. Just below the movement passage of the mirror 15 there is provided in parallel thereto and consequently to the original 11 an endless belt 22 for receiving the photosensitive paper 12 at the input end thereof from a supply of paper 12' to be fed one by one by means of a feed roller 23, and for carrying the same to the projection position. The running belt is stopped when it has carried the sensitive paper 12 to said position. In the electrostatic copier, a charger 24 is provided, which may be mounted together with the mirror 15 on the movable frame, not shown, but preferably placed at the front of the endless belt with the possibility of providing a double charger. When the sensitive paper 12 has been scanningly exposed, the belt 22 is driven again for feeding the same to a developer tank 25 arranged adjacent the outlet end thereof.

The light passage from the original to the photosensitive paper is made W-shaped as seen in in FIG. 2, but it is of course possible to provide a pair of intermediate mirrors $14'_1$ and $14'_2$ as shown in FIG. 4 instead of just one mirror 14' in FIG. 2 on the upstream or object side of objective 13, and similarly a pair of intermediate mirrors $15'_1$ and $15'_2$ on the downstream or image side of objective 13. In this case it is further necessary to provide a mirror 14" which is fixedly positioned, for receiving light from the first intermediate mirror $14'_1$ to direct the light to the second intermediate mirror $14'_2$, and also a fixedly positioned mirror 15" for the same purpose on the downstream side. It will be appreciated that the movement distance for the pair of intermediate mirrors 14'₁, 14'₂ and the pair of intermediate mirrors 15'₁ and 15'₂ is one-fourth respectively of the movement distances necessary for the scanning mirrors 14 and 15 in the arrangement in FIG. 4 instead of one-half as in FIG. 2.

FIG. 5 shows another arrangement of the optical elements according to the invention which is suitable for an electrophotographic copier for obtaining a mirror image on the photo sensitive sheet member. There are arranged similar to FIG. 2 the original 11 and the photosensitive sheet member 12 respectively in horizontal and consequently in parallel relations with each other, oppositely and face to face. The lens 13, which lacks the mirror backing the lens 13 shown in FIG. 2, is similarly fixedly positioned between the two, but substantially at the center on a horizontal plane therebetween, different from FIG. 2 in which the lens 13 is positioned substantially at the outmost position. The mirrors 14 and 14' on the impinging or object side and the mirrors 15 and 15' on the exiting or image side are arranged respectively in symmetry with respect to a center point of the lens 13, so that when the mirror 14 is moved for the scanning in parallel to the original 11 from the leftmost position represented by the solid lines to the rightmost position represented by the phantom lines, with the intermediate mirror 14' synchronously moved in the same direction from the solid line position to the phantom line position in FIG. 5, and when the mirror 15 is moved for scanning in the direction opposite to the above, namely from the rightmost solid line position to the leftmost phantom line position, with the intermediate mirror 15' synchronously moved, then light from the original 11 is reflected first by the mirror 14 and then by the mirror 14' to the fixedly positioned lens 13 through which it is further directed to the mirror 15', then to the mirror 15, and finally to the photo sensitive sheet member 12. In order to carry out correct and stable projection, the optical passage length from the original 11 to the photosensitive sheet member 12 is kept always constant, and for that purpose the pulley-cable system can be supposed and actually utilized just like as in FIG. 2. It will be appreciated also that the movement distance from the solid line position to the phantom line position in FIG. 5 is $a$ for the original scanning mirror 14 and $a/2$ for the related intermediate mirror 14', and that the movement is $b$ for the photosensitive sheet member scanning mirror 15 and $b/2$ for the intermediate mirror 15', similar to FIG. 2. The magnification can be decided at will by selecting the value of $b/a$.

Changes of the top-bottom and left-right relationships of the image are traced from the original to the photosensitive sheet member as in FIG. 2, similarly shown with small arrows, from which it will be appreciated that the image projected on the sensitive paper is in mirror image relation to the original image.

FIG. 6 shows the electrophotographic copier of the transfer type and provided with the projector system as shown in FIG. 5. Since the reference numerals and the arrangement are the same as those in FIG. 5 with respect to the optical system and in FIG. 3 with respect to the remainder, repeated explanation shall be omitted, except only that since the photosensitive sheet member 12 can not be used as it is because of the mirror image thereon, the electrostatic image must be transferred onto a transfer paper 27 by passing said transfer paper together with the photosensitive member in intimate contact between a pair of rollers 26, said paper 27 being fed subsequently to the developer tank 25.

The last embodiment is described by way of example as applied to an electrophotographic copier of the type which transfers the electrostatic latent image to a transfer paper. But such embodiment is also applicable to a PPC (plain paper copier), i.e., to a copier of the type which, after the powder development of the electrostatic latent image, transfers the toner image to the transfer paper and the toner image is thereafter fixed.

FIG. 7 shows a modification of the principle of FIG. 5. The former is different from the latter merely in that intermediate mirrors 14'B and 15'B consist of two mirrors combined at a right angle to form corner reflectors.

FIG. 8 shows another modification form which is different from FIG. 5 merely in that intermediate mirrors 14'C and 15'C are divided respectively into two mirrors as in FIG. 4 in relation to FIG. 2. Accordingly two additional mirrors 14''C and 15''C are stationary so that the former may receive light from the first of said intermediate mirrors 14'C to reflect to the second intermediate mirror 14'C, and the fixedly positioned mirror 15''C may receive light from the first of said intermediate mirrors 15'C to reflect the light to the second, as in FIG. 4. Similarly the movement distance for the pair of intermediate mirrors 14'C on the impinging side and the pair of intermediate mirrors 15'C on the exiting side are one-fourth respectively of the movement distances necessary for the scanning mirrors 14 and 15 in the arrangement of FIG. 8 instead of one-half as in FIGS. 5 and 7.

It will be readily appreciated by comparing FIGS. 2, 4, 5, 7 and 8 with FIG. 1 that the projector device of the scanning type according to the invention can be made far more compact and the magnification can be varied, unlike the conventional scanning projection method or device.

What is claimed is:

1. A slit exposure optical system for a photographic copying apparatus in which an original is arranged in parallel with a photosensitive member in face-to-face relationship comprising:
    a stationary light focussing objective,
    a first movable reflector means for scanning an image of the original,
    a second movable reflector means oriented to reflect the image from said first movable reflector means to said objective,
    a third movable reflector means oriented to reflect the image from said objective,
    a fourth movable reflector means for scan-projecting the image of said original reflected from said third movable reflector means to said photosensitive member, and
    means for synchronously moving said first, second, third and fourth movable reflector means in the same direction along paths parallel with respect to said original and photosensitive member, wherein the rate of movement of said second movable reflector means is half that of said first movable reflector means in scanning said original, and the rate of movement of said third movable reflector means is half that of said fourth movable reflector means for scanning the image of said original on to said photosensitive member.

2. A slit exposure optical system as claimed in claim 1, wherein each of said second and third movable reflector means includes a plurality of substantially coplanar reflectors;

said system further comprising a plurality of fixed reflector means arranged substantially in a plane perpendicular to the optical axis of and intersecting said objective, the number of said fixed reflector means corresponding to one half the number of said movable reflectors, and wherein the sum of the rates of movement of said reflectors of said second movable reflector means is half the rate of movement of said first movable reflector means to scan the image of the original, and the sum of the rates of movement of said reflectors of said third movable reflector means is half the rate of movement of said fourth reflector means to scan-project the image of said original on to said photosensitive member.

3. A slit exposure optical system for a copying apparatus in which an original and a photosensitive member are parallelly arranged in face-to-face relationship comprising:

a stationary light focusing objective, a first movable reflector means for scanning an image of the original, a second movable reflector means for reflecting an image from said first movable reflector means to a third movable reflector means through said objective, a fourth movable reflector means for scan-projecting the image of said original reflected from said third movable reflector means to said photosensitive member, means for synchronously moving said first, second, third and fourth movable reflector means along respective paths parallel with respect to said original and said photosensitive member, wherein the rate of movement of said second movable reflector means is half that of said first movable reflector means to scan said original, and the rate of movement of said third movable reflector means is half that of said fourth movable reflector means to scan-project an image of said original on to said photosensitive member, and wherein said first and second movable reflector means moves in the opposite direction with respect to said third and fourth movable reflector means.

4. An optical exposure scanning device in a copying machine in which an original and a photosensitive member are positioned in transversely spaced parallel confronting relationship comprising a stationary optical objective, an original scanning first optical system including a first scanning reflector and means for moving said first scanning reflector along a longitudinal path parallel to and along a length of the original and also including a first optical unit including at least one second reflector and means for moving said second reflector along a longitudinal path in synchronism with and at a slower rate than said first reflector to provide a light path of constant length from the original to the objective with the movement of and by way of said first reflector and first optical unit, and a photosensitive member scanning second optical system including a scanning third reflector and means for moving said third reflector along a longitudinal path parallel to and along a length of the photosensitive member and also including a second optical unit including at least one fourth reflector and means for moving said fourth reflector along a longitudinal path in synchronism with and at a slower rate than said third reflector to provide a light path of constant length from the objective to the photosensitive member with the movement of and by way of said third reflector and second optical unit, said first and third reflectors being movable in synchronism.

5. The device of claim 4 wherein said first optical unit includes one of said second reflectors moving at one half the rate of movement of said first reflector and directing light from said first reflector to said objective and said second optical unit includes one of said fourth reflectors moving at one half the rate of movement of said third reflector and directing light from said objective to said third reflector.

6. The device of claim 5 wherein said objective includes a reflecting surface and is positioned intermediate the planes of said original and photosensitive member.

7. The device of claim 5 wherein said second and fourth reflectors comprise corner reflectors.

8. The device of claim 4 including a stationary fifth reflector positioned to receive light from said first reflector by way of said first optical unit and direct it to said objective by way of said first optical unit and a stationary sixth reflector positioned to receive light from said objective by way of said second optical unit and direct it to said third reflector by way of said second optical unit, said optical units moving at one quarter the rates of movement of the respective first and third reflectors.

9. The device of claim 4 wherein said reflectors and optical units move in the same direction.

10. The device of claim 4 wherein said first reflector and said first optical unit are synchronously movable in one direction and said third reflector and second optical unit are synchronously movable in a direction opposite to that of said first reflector and first optical unit.

11. The device of claim 4 wherein the ratio of the rate of movement of the third reflector to the rate of movement of the first reflector is equal to the magnification ratio of the image on the photosensitive member to the original.

* * * * *